United States Patent Office 3,114,772
Patented Dec. 17, 1963

3,114,772
PREPARATION OF ALLYL-SUBSTITUTED KETONES
Nicholas B. Lorette and William L. Howard, Lake Jackson, Tex., assignors to The Dow Chemical Company, Midland, Mich., a corporation of Delaware
No Drawing. Filed July 13, 1960, Ser. No. 42,476
5 Claims. (Cl. 260—586)

This invention relates to a new and useful process for making unsaturated ketones and more particularly to a process for preparing ketones having allyl groups substituted on the alpha carbons thereof.

The compounds of the present invention are useful as chemical intermediates, as for example allylacetone is an intermediate in the process for preparing synthetic pyrethrins. This intermediate has in the past been prepared by the cumbersome route of hydrolyzing ethyl alpha-allylacetoacetate with caustic and subsequently decarboxylating the acid by heating. The same reference shows the preparation of crotylacetone in like manner. Due to the difficulty in preparation of the unsaturated ketones and the lack of availability of their starting materials, very few synthetic pyrethrin products have been synthesized by the use of this class of intermediates.

In the art it is known that allyl vinyl ethers will undergo rearrangement at fairly low temperatures to form allyl-substituted aldehydes and ketones, although higher temperatures cause the reaction to proceed more rapidly.

The only known species of allyl-substituted ketones prepared in this manner from the allyl vinyl ethers are allylacetone and allylacetophenone which were prepared by heating allyl methylvinyl ether in the vapor phase at 255° C. and by refluxing alpha-phenylvinyl allyl ether at atmospheric pressure, respectively.

Other art involves diallyl acetals, such as the methallyl acetal of crotonaldehyde and isobutyraldehyde diallyl acetal. These have been converted to their respective allyl-substituted aldehydes. The former was by pyrolysis at 210–260° C., while the latter was distilled at about 170–180° C. in the presence of phosphoric acid. None of these prior art processes have met with much success because the starting materials for the preparation of these allyl-substituted compounds are not easily obtained. Thus, it would be advantageous to find a method for preparing the allyl-substituted compound employing readily available materials.

It is therefore one object of the present invention to provide a simple, one-step, direct method of allylating the alpha carbon atoms of a ketone by the reaction of readily obtainable materials. Another object of this invention is to provide a method of producing alpha-allyl-substituted ketones in high yield. A further object of this invention is to provide a method for producing alpha-poly-allyl-substituted ketones. These and other objects will become apparent to those skilled in the art from reading the following specification and examples.

It has been found that alpha-allyl-substituted ketones now can be prepared by contacting in the liquid phase at a temperature of from about 70° C. to about 400° C. an allylic alcohol with a ketone having at least one free hydrogen on an alpha carbon in the presence of an acid-acting catalyst.

In one manner of carrying out the aforesaid objects in accordance with the present invention, one can react from about 1 to about 10 moles of an allylic alcohol per mole of ketone at a temperature of from about 70° C. to about 400° C. in the liquid phase. When a temperature of from about 70° C. to about 200° C. is employed, it is preferable to also employ a lower ketal in an amount about equimolar to the ketone present. The conversion of the ketone to the desired allylated products is thereby improved, although some of the desired product is produced at the low temperatures even without the presence of the ketal. Higher ratios of alcohol to ketone have not been found to be as effective at the lower temperatures as, for example, having a lower ketal present and about equimolar concentrations of the alcohol and ketone, that is, equimolar amounts of alcohol, ketone, and ketal.

At temperatures of from about 200° C. to about 400° C. there appears to be no advantage in having the lower ketal present because the higher mol ratios of alcohol to ketone give satisfactory conversions without it.

In any event the use of the ketal frequently enables one to operate at lower temperatures and at atmospheric pressure, whereas without the ketal autogenous elevated pressures frequently are necessary to attain a reaction temperature which will produce the high conversions and yields. Subatmospheric pressures can be used when the reactants are high boiling. However, atmospheric pressure is preferred.

In a particular embodiment of the invention, a mixture of allyl alcohol and acetone in three to one molar ratio was charged to a bomb in an autoclave together with a minor amount of $CaCl_2$ as catalyst and heated at autogenous pressure to a temperature of 250–260° C. for one hour. About 32 percent of the acetone was converted to allylated product. Both the percent of conversion of the ketone to allylated product and the percent of poly-allylated ketone in the product vary directly with the length of reaction time and the ratio of alcohol to ketone.

In a like manner, many aliphatic, cycloaliphatic and aryl alkyl ketones can be reacted with allylic alcohols to obtain alpha-allyl-substituted ketones.

The reaction of allyl alcohol and a ketone occurs at temperatures below 200° C. down to about 70° C. For example, allylated ketones were obtained in about 20 percent yield when two moles of allylic alcohol and two moles of a cyclic ketone were reacted in the presence of a catalytic amount of p-toluenesulfonic acid in about two moles of benzene. The benzene was used to azeotrope the water formed. The reaction was slow, yields were low and both lighter and heavier by-product fractions were obtained.

When the same reaction was run, using slightly more than 2:1 ratio of alcohol to ketone, and dimethoxypropane in an amount equal in moles to the ketone, in the presence of the p-toluenesulfonic acid catalyst, the yield of allylated ketones was >90 percent. Benzene was used as a solvent in the reaction and to remove the by-product methanol; the acetone distilled over simultaneously with the benzene-methanol azeotrope.

If the alcohol and ketone derived from the ketal are not removed during the process, the reactant ketal will be removed as an azeotrope with either the alcohol or ketone, or both. Hence, the use of an azeotroping solvent is desirable and failure to use it will result in the necessity of using a large excess of the ketal which would affect the economics of the process adversely. The use of the solvent can also prevent polymeric by-products from forming by acting as a diluent and by reducing the pot temperature.

Alcohols which can be employed in the process of this invention, are, for example, allyl, methallyl and crotyl alcohols and 2-cyclopenten-1-ol and 2-cyclohexen-1-ol. Each of these will, when reacted with the ketone alone or with the ketone together with a ketal, form ketones having one or more allylic groups attached to the alpha carbon atoms thereof. Thus, in general, the allylic alcohols found to be useful in our process are 2-alken-1-ols and 2-cycloalken-1-ols which contain from three to six carbon atoms.

Ketones useful in the practice of our invention are limited to those in which there is at least one hydrogen atom on an alpha carbon atom, i.e., a carbon atom adjacent to the carbonyl group of the ketone. As examples of ketones which can be used in our process may be listed: acetone, methyl ethyl ketone, 2-pentanone, 3-pentanone, diisopropyl ketone, methyl isopropyl ketone, dibutyl ketone, diisobutyl ketone, and the like alkyl ketones, the allyl-substituted alkyl ketones such as allyl acetone, 3-allyl-5-hexen-2-one, 1,8-nonadien-5-one; cyclic and allyl-substituted cyclic ketones such as, for example, cyclopentanone, cyclohexanone, the 2,2- and 2,5-diallyl cyclopentanones and the 2,2- and 2,6-diallyl cyclohexanones; aryl alkyl ketones such as acetophenone, phenyl ethyl ketone, phenyl propyl ketone, phenyl isopropyl ketones and alpha-allyl-substituted ketones, as for example, allyl and diallyl acetophenone. Thus, ketones which have been found useful in the process of our invention are those containing from three to 13 carbon atoms.

Solvents useful for azeotroping the by-product alkanols and ketones and as diluents in the liquid phase reaction are, for example, hexane, benzene, toluene and other inert hydrocarbons having appropriate boiling points and which form azeotrops with the alcohols produced by the reaction.

The catalysts which are effective in the practice of our invention are acid-acting catalysts. The term "acid-acting catalyst," i.e. acidic catalysts; as used herein is defined as: organic and inorganic acids which have a pH of less than 7 in water; salts whose water solutions have a pH of less than 7; and salts which are acid in the classical sense of being able to neutralize bases, either because of their electron-accepting Lewis acid-type properties or by virtue of containing an ionizable proton, even though they may give an alkaline reaction in water.

Examples of inorganic acids which catalyze this reaction are hydrochloric, hydrobromic, hydrofluoric, sulfuric, sulfurous, nitric, and phosphoric. Organic carboxylic acids, such as formic, acetic, propionic, and benzoic, and organic sulfonic acids such as benzenesulfonic, p-toluenesulfonic, and camphorsulfonic also work as catalysts. Cation exchange resins in the acid form and chlorinated carboxylic acids such as chloroacetic, di- and trichloroacetic and chloropropionic acids can also be used as catalysts.

Salts usually recognized as acidic, such as sodium and potassium bisulfates and dibasic phosphates and the like, which give water solutions having a pH less than seven, are useful as catalysts for the reaction.

Salts which may be effective because of Lewis acid-type properties or because they have ionizable protons, regardless of their reaction in water, such as magnesium, zinc, ferric, aluminum, cobalt, calcium, chromium, and ammonium chlorides, sulfates, nitrates and the like; sodium and potassium monobasic phosphates and cobalt phosphate and the like are useful catalysts in the reaction.

The range of catalyst concentration operable for the purpose of this invention is about 0.01 g. to about 5.0 g. per mole of ketone reactant. It is desirable, though not essential, that the catalyst be nonvolatile under the conditions of reaction.

The invention is further illustrated by the following specific examples:

*Example 1*

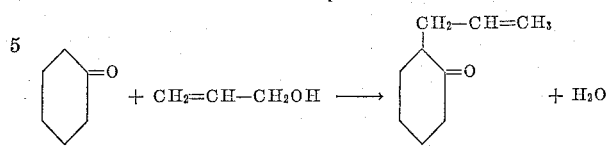

A solution of 196 g. (2.00 moles) of cyclohexanone, 232 g. (4.00 moles) of allyl alcohol, and 1.5 g. of p-toluenesulfonic acid was distilled at atmospheric pressure and the distillate boiling at 88–91° C. was collected until a total of 150 ml. had been obtained. The distillate was identified as a mixture of water and allyl alcohol, whose azeotrope boils at 88° C. The distilland was then made basic with a small excess of sodium hydroxide and distilled further. A yield of 10 percent of 2-allylcyclohexanone was obtained. The residue consisted of higher boiling materials which were not identified.

*Example 2*

Two gram-moles (196 g.) of cyclohexanone, 2.00 gram-moles (116 g.) of allyl alcohol, 1.5 g. of p-toluenesulfonic acid, and 200 mls. of benzene were combined and refluxed at atmospheric pressure with a water trap in the condensate stream. After seven days the rate of water production had become negligible, so the reaction solution was made basic by the addition of 1.0 g. of sodium hydroxide dissolved in 25 ml. of methanol. The solution was then cooled to room temperature and washed with water, dilute aqueous acetic acid, and dilute aqueous potassium carbonate. The benzene phase was separated, dried over potassium carbonate, filtered, and distilled at reduced pressure. In addition to both higher and lower boiling fractions which were not further identified, the following fractions were obtained:

(A) 2-allylcyclohexanone, B.P. 75° C./mm. to 67° C./4 mm., $n_D^{24}$ 1.4667, yield 22 g. (8 percent);

(B) 2,2-diallylcyclohexanone, B.P. 96–8° C./4 mm.; $n_D^{24}$ 1.4849, yield 47 g. (13 percent); and (C) An intermediate fraction of 14 g. identified as a mixture of these two compounds.

*Example 3*

When the reaction of Example 2 was run with 4.4 moles of alcohol, 2 moles of ketone, 10.3 moles of benzene and 2.2 moles of 2,2-dimethoxypropane in the presence of the same catalyst, the yields of the two allylated ketones were 85 percent and 7.8 percent, respectively. The benzene removed the by-product methanol and the acetone distilled over simultaneously.

*Example 4*

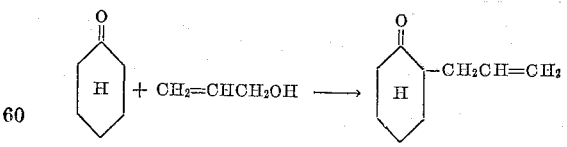

At atmospheric pressure a solution composed of 3 moles of allyl alcohol, 1 mole of cyclohexanone and 0.1 g. of $H_3PO_4$ (85 percent) was heated for 240 hours at 105° C. The final reaction solution was very slightly colored (yellow). The conversion of cyclohexanone was 21 percent and the yield of 2-allylcyclohexanone was 94 percent. A trace of diallylcyclohexanone was detected by vapor chromatography.

*Example 5*

A solution composed of one mole of methyl ethyl ketone, 4 moles of allyl alcohol and 0.1 g. of p-toluenesulfonic acid was refluxed at atmospheric pressure for 12 hours. By vapor chromatography analysis, there was 0.8 percent of the methyl ethyl ketone converted to 3-methyl-5-hexen-2-one.

*Example 6*

A solution composed of 150 ml. of allyl alcohol, acetone (5.5 to 1 mole ratio) and 0.09 g. $H_3PO_4$ was refluxed at atmospheric pressure. The temperature of the refluxing solution was 87° C. After 91 hours there was a trace of allyl acetone present as shown by vapor chromatography.

*Example 7*

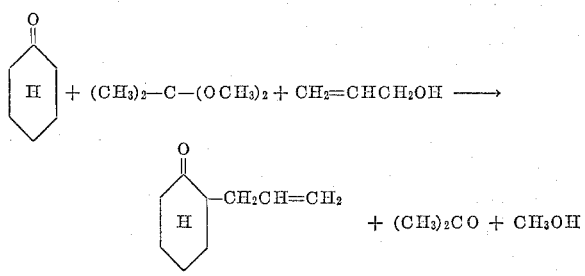

A solution composed of 2 moles of cyclohexanone, 4.4 moles of allyl alcohol, 2.2 moles of acetone dimethyl acetal, 0.2 g. p-toluenesulfonic acid and one liter of benzene was distilled through a three-foot, vacuum-jacketed, glass helices packed column. After 475 ml. of benzene-methanol-acetone azeotropes were collected at 55–60° C. at a take-off rate of 10 percent, the rate of take-off was increased to 30 percent. The distillation was continued in this manner until the distillation flask temperature reached 190° C. during which time the overhead temperature reached 95° C. The clear yellow residue was then fractionated at reduced pressure to give an 85 percent yield (based on starting cyclohexanone) of 2-allylcyclohexanone, B.P. 80° C. (10 mm.), $n_D^{25}$ 1.4668, $d_{25}$ 0.927 g./ml.

There was also obtained a 7.8 percent yield of 2,2-diallylcyclohexanone, B.P. 111° C. (10 mm.), $n_D^{25}$ 1.4840, $d_{25}$ 0.937 g./ml.

*Analysis.*—Calcd. for $C_{12}H_8O$: C, 80.85; H, 10.18. Found: C, 80.96; H, 10.15.

*Example 8*

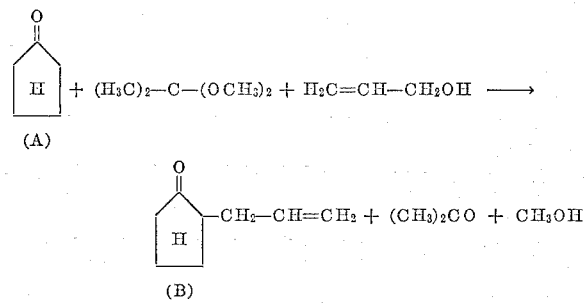

A solution composed of 2 moles of cyclopentanone, 4.4 moles of allyl alcohol, 2.2 moles of acetone dimethyl acetal, 0.2 g. p-toluenesulfonic acid and one liter of benzene was distilled through a three-foot, vacuum-jacketed, glass helices packed column. After 475 ml. of benzene-methanol-acetone azeotropes were collected at 55–60° C. at a take-off rate of 10 percent, the rate of take-off was increased to 30 percent. Distillation was continued at this rate until the distillation flask temperature reached 180–190° C. during which time the overhead temperature reached 95° C. The residue was then fractionated at reduced pressure to give a 95 percent yield of 2-allylcyclopentanone based on a conversion of 67 percent of the original cyclopentanone. Some of the acetone derived from the reactant ketal was converted to allylacetone; yield was 0.47 mole.

*Examples 9–14*

In a manner similar to Example 7 and using the same molar quantities of reactants, the following ketones were allylated:

| Starting Ketone (A) | Percent (A) Converted | Product (B) | Percent Yield (B) | Moles of 5-Hexen-2-one |
|---|---|---|---|---|
| 2-allylcyclo-hexanone | 59 | 2,2-diallyl-cyclohex-anone.[a] | 97 | 0.86 |
| 2,2-diallylcyclohexanone | 23 | 2,2,6-triallyl-cyclohex-anone. | 85 | 1.3 |
| 2-allylcyclo-pentanone | 35 | 2,2-diallylcy-clopen-tanone.[b] | 93 | 1.0 |
| 2,2-diallylcyclopentanone | 12 | 2,2,5-triallyl-cyclopen-tanone. | 56 | 1.2 |
| acetophenone | 41 | 1-phenyl-4-penten-1-one. | 84 | 0.46 |
| 2-propylcyclo-hexanone | 59 | 2-allyl-2-pro-pylcyclo-hexanone. | 95 | 0.04 |

[a] Contained 4–7 percent 2,6-diallylcyclohexanone.
[b] Contained 4–7 percent 2,5-diallylcyclopentanone.

When the conversion of the reactant ketone (A) is incomplete, the 5-hexen-2-one formed from the reactant ketal becomes a significant product.

The physical properties of the above allylated ketones (B) are given below.

PHYSICAL PROPERTIES

| Compound | B.P. (° C.) | Pressure (mm. Hg) | Index of Refraction | ° C. | Density, g./ml. | ° C. |
|---|---|---|---|---|---|---|
| 2-allylcyclopentanone | 62 | 10 | 1.4582 | 24 | 0.927 | 24 |
| 2,2,6-triallylcyclohexanone | 98 | 1–2 | 1.4907 | 24 | 0.923 | 24 |
| 2,2-diallylcyclopentanone | 93 | 10 | 1.4770 | 23 | 0.927 | 23 |
| 2,2,5-triallylcyclopentanone | 95 | 3 | 1.4817 | 25 | 0.920 | 25 |
| 1-phenyl-4-penten-1-one | 126 | 16 | 1.5308 | 23 | 0.994 | 24 |
| 2-allyl-2-propylcyclohexanone | 96 | 4 | 1.4720 | 24 | 0.918 | 24 |

The following five examples show the effect of varying ratios of reactants and time of reaction. In each experiment listed in the tables below, 150 ml. of reaction solution and 0.09 g. of $H_3PO_4$ was placed in an autoclave and run for the time indicated at 250–260° C. Analysis of the reaction products was made by vapor phase chromatography.

*Examples 15–17*

| Example | Mole Ratio of Allyl Alcohol: Acetone | Time (Hrs.) | Percent Acetone Converted to—[1] | |
|---|---|---|---|---|
| | | | Allyl-acetone | Diallyl-acetones |
| 15 | 1:1 | 1 | 12.7 | Trace |
| | 5:1 | 1 | 34 | 7.0 |
| 16 | 1:1 | 3 | 24 | 1.8 |
| | 5:1 | 3 | 39 | 25.9 |
| 17 | 1:1 | 6 | 33.8 | 7.9 |
| | 5:1 | 6 | 25.5 | 50.1 |

[1] Only traces of other products were found in each of the above experiments. Essentially all of the acetone, which was not allylated, was recovered.

Examples 18–19

| Moles of Allyl Alcohol per Mole of Acetone | Time (Hrs.) | Percent Acetone Converted to—[1] | | |
|---|---|---|---|---|
| | | Allyl-acetone | Diallyl-acetone | Non-adienone |
| Example 18: | | | | |
| 2 | 3 | 32.4 | 7.8 | 2.8 |
| 3 | 3 | 36.9 | 8.8 | 6.0 |
| 5 | 3 | 39 | 20.6 | 5.3 |
| Example 19: | | | | |
| 2 | 6 | 34.2 | 17.9 | 7.1 |
| 3 | 6 | 31.5 | 20.6 | 7.7 |
| 5 | 6 | 25.5 | 36.5 | 13.6 |

[1] Essentially all acetone not allylated was recovered; no other compounds made except in trace amounts.

The following example illustrates the use of another allylic-type alcohol and a different ketone in the allylation reaction.

Example 20

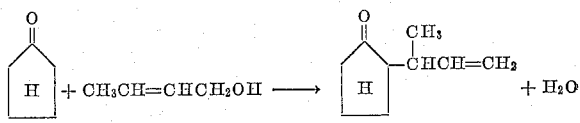

A 150 ml. charge of a solution composed of 1 mole of cyclopentanone and two moles of 2-buten-1-ol was heated to 220° C. for two hours. The charge was catalyzed with 0.09 g. of $H_3PO_4$ (85 percent). By vapor chromatography there was a 64.6 percent conversion of the cyclopentanone and an 84.3 percent yield of 2-(1-methyl-2-propenyl)-cyclopentanone. The product was recovered by distillation and had the following physical properties: $n_D^{24}$ 1.4602, B.P. 91° C. (30 mm.), $d_{25}$ 0.920 g./ml.

Analysis.—Calcd. for $C_9H_{14}O$: C, 78.21; H, 10.21. Found: C, 78.28; H, 10.26.

The following examples were run in the same manner as the preceding Example 15–20, but the mole ratio of reactants was maintained constant, i.e., 3 alcohol: 1 acetone. Numerous acid-acting catalysts are shown to be effective for allylating the acetone.

Example 21–35

| Example | Catalyst Used | Amount of Catalyst, g. | Time (Hrs.) | Percent Acetone Converted to—[1] | |
|---|---|---|---|---|---|
| | | | | Allyl-acetone | Diallyl-acetones[2] |
| 21 | $CO_3(PO_4)_2.8H_2O$ | 0.4 | 3 | 43 | 19.1 |
| 22 | $CH_3COOH$ | 0.5 | 3 | 20.9 | 1.7 |
| 23 | $NaHSO_4$ | 0.4 | 1 | 13 | 5.3 |
| 24 | $KHSO_4$ | 0.4 | 1 | 15.2 | 6.3 |
| 25 | $CaCl_2$ | 0.4 | 1 | 26 | 5.6 |
| 26 | $ZnCl_2$ | 0.4 | 1 | 21.8 | 6.1 |
| 27 | $NH_4Cl$ | 0.4 | 1 | 17.4 | 13.5 |
| 28 | $CoCl_2$ | 0.4 | 1 | 24 | 5.3 |
| 29 | $Na_2HPO_4$ | 0.4 | 1 | 22 | 0.8 |
| 30 | $NaH_2PO_4.H_2O$ | 0.4 | 1 | 20 | 0.7 |
| 31 | $Na_3PO_4.12H_2O$ | 0.4 | 1 | 0.7 | |
| 32 | $H_2SO_4$ | 0.1 | 1 | 20 | 13.5 |
| 33 | $p\text{-}CH_3C_6H_4SO_3H$ | 0.1 | 1 | 11 | 5.0 |
| 34 | $NaCl$ | 0.4 | 1 | 2.3 | Trace |
| 35 | $KI$ | 0.4 | 1 | 6.3 | Trace |

[1] Essentially all acetone not allylated was recovered; no other compounds made except in trace amounts.
[2] Diallylacetone, 1,8-nonadien-5-one.

Note that the catalyst in Example 31 is basic and that almost no product was made and that the neutral salts in Examples 34 and 35 were nearly as poor.

The following examples show the effect of varying the amount of catalyst on the product obtained. The experiments used the same volume of reactants at 3:1 mole ratio of alcohol to acetone and was run at 250–260° C. for one hour. The catalyst was phosphoric acid.

Example 36

| Run No. | Amount of Catalyst (g.) | Percent Acetone Converted to—[1] | | |
|---|---|---|---|---|
| | | Allyl-acetone | Diallyl acetone | Non-adienone |
| 1 | 0.045 | 29.5 | 2.1 | 1.1 |
| 2 | 0.135 | 27.0 | 5.5 | 1.9 |
| 3 | 0.270 | 27.5 | 11.9 | 2.9 |
| 8 | 0.720 | 23.5 | 11.8 | 2.1 |
| 9 | 1.26 | 20.5 | 11.3 | 1.5 |

[1] Two isomeric triallyl compounds were found in Run No. 9 which totaled about 2 percent; only traces of other compounds were obtained and essentially all unconverted acetone was recovered.

Example 37

The autoclave was charged with 150 ml. of a solution composed of 1,1-diallyl acetone and allyl alcohol in a molar ratio of 1:3. The reaction time was two hours and the temperature was 240°–250° C. The amount of $H_3PO_4$ catalyst was varied as reported in the following table.

| Amount Catalyst (g.) | Percent Diallyl-acetone Recovered | Percent Diallylacetone Recovered as— | |
|---|---|---|---|
| | | 1,1,1-Triallyl-acetone | 1,1,3-Triallyl-acetone |
| 0.09 | 93 | 1.2 | 4.9 |
| 0.36 | 73 | 16 | 8 |
| 0.9 | 56 | 35 | 2 |
| 1.8 | [1] 21 | 16 | 4 |

[1] The high amount of catalyst caused the formation of a thick viscous polymeric material (24 g.).

We claim:

1. A process for the preparation of alpha-allyl-substituted ketones consisting of contacting in the liquid phase in the presence of an acidic catalyst at a temperature of from about 70° C. to about 400° C. an unsubstituted alcohol selected from the group consisting of 2-alken-1-ols and 2-cycloalken-1-ols having from 3 to 6 carbon atoms, with a ketone selected from the group consisting of alkyl and aryl alkyl ketones having from 3 to 10 carbon atoms, and cyclopentanone and cyclohexanone and wherein the keto group is the sole functional group, and α-allyl-substituted derivatives thereof and wherein the ketone has at least one hydrogen on an alpha carbon atom.

2. The process of claim 1 wherein the alcohol is allyl alcohol.

3. A process as set forth in claim 1 wherein the contacting is carried out in the presence of acetone dimethyl acetal.

4. A process as set forth in claim 1 wherein said alcohol and ketone are present in about equimolecular amounts.

5. A process as set forth in claim 1 wherein said alcohol is present in an amount from about two to about ten molecular equivalents of the ketone.

References Cited in the file of this patent

UNITED STATES PATENTS 2,064,254    Fuchs et al. _____ Dec. 15, 1936

OTHER REFERENCES

Allyl Alcohol (Shell Chemical Corp.), pp. 17–18 (1946). (Division 38, 1 Bookcase VI.)